US012783517B1

(12) United States Patent
Upadhyay et al.

(10) Patent No.: US 12,783,517 B1
(45) Date of Patent: Nov. 3, 2026

(54) DYNAMIC LARGE TABLE FILTERING

(71) Applicant: Teradata US, Inc., Miamisburg, OH (US)

(72) Inventors: Shashankesh Upadhyay, Badalalpur (IN); Samrat Pandiri, Hyderabad (IN); Srinivas Rao Pabbaraju, Hyderabad (IN)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/894,335

(22) Filed: Sep. 24, 2024

(51) Int. Cl.
*G06F 16/2453* (2019.01)

(52) U.S. Cl.
CPC .. *G06F 16/24542* (2019.01); *G06F 16/24537* (2019.01)

(58) Field of Classification Search
None
See application file for complete search history.

(56) References Cited

U.S. PATENT DOCUMENTS

2013/0198165 A1* 8/2013 Cheng .................... G06F 16/21 707/714
2014/0095502 A1* 4/2014 Ziauddin .............. G06F 16/285 707/E17.046
2014/0095520 A1* 4/2014 Ziauddin .......... G06F 16/24557 707/E17.014
2014/0280036 A1* 9/2014 Korlapati .......... G06F 16/24542 707/718
2016/0196310 A1* 7/2016 Dutta ................ G06F 16/24553 707/769
2017/0185647 A1* 6/2017 Billington ........... G06F 16/9535
2019/0220464 A1* 7/2019 Butani ................ G06F 16/2455
2022/0092069 A1* 3/2022 Hartsing ........... G06F 16/24544

* cited by examiner

*Primary Examiner* — Christopher J Raab
(74) *Attorney, Agent, or Firm* — Randy L. Campbell, Jr.

(57) ABSTRACT

A relational database management system (RDBMS) executing in a computer system manages a relational database storing column values in columns of a large table and a small table in rows spread across one or more objects. The RBMS also stores metadata comprising summarized information about the column values in the rows and objects of the small table. The RDBMS processes a query that joins the column of the small table to the column of the large table through an equivalence predicate, and derives one or more literal filter conditions for the equivalence predicate from the metadata of the small table. The RDBMS binds the literal filter conditions into the query, and performs a query execution plan for the query with the literal filter conditions, so that only the objects and/or rows in the large table that are qualified by the literal filter conditions are accessed.

19 Claims, 5 Drawing Sheets

DYNAMIC LARGE TABLE FILTERING

PRIOR ART

This invention relates to methods and techniques for query optimization in relational database management systems.

BACKGROUND OF THE INVENTION

Computer systems implementing a relational database management system (RDBMS) are well known in the art. An RDBMS stores data as relational tables comprised of objects containing rows and rows containing columns, and uses a data manipulation language (DML), such as a structured query language (SQL), to create, modify and access the data.

An SQL interface allows users to formulate relational operations on the tables either interactively, in batch files, embedded in host languages, etc. Operators are provided in SQL that allow the user to manipulate the data, wherein each operator performs functions on one or more tables and produces a new table as a result. The power of SQL lies on its ability to link information from multiple tables or views together to perform complex sets of procedures with a single statement.

The SQL interface allows users to formulate relational operations on the tables. One of the most common SQL queries executed by the RDBMS is the SELECT statement. In the SQL standard, the SELECT statement generally comprises the format: "SELECT <clause> FROM <clause> WHERE <clause> GROUP BY <clause> SAMPLE <clause>." The clauses generally must follow this sequence, but only the SELECT and FROM clauses are required.

The result of a SELECT statement is a subset of data retrieved by the RDBMS from one or more existing tables stored in the relational database, wherein the FROM clause identifies the name of the table or tables from which data is being selected. The subset of data is treated as a new table, termed the result table, which typically comprises a temporary table. In general, the items specified in the SELECT clause determine the columns that will be returned in the result table from the table(s) identified in the FROM clause.

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specify a comparison between two values comprising columns, constants or correlated values. Multiple predicates in the WHERE clause are themselves typically connected by Boolean operators.

A join operation is usually implied by naming more than one table in the FROM clause of a SELECT statement. A join operation makes it possible to combine tables by combining rows from one table with another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

Joins may involve one or more smaller tables joined to a larger table, such as one or more small dimension tables joined to a large fact table. Such join operations can be costly in terms of performance. In joins that involve small and large tables, each row of the small table might be joined to many rows of the large table.

Techniques have been developed for minimizing the time required to perform such a join operation. However, there is still a need in the art for additional optimization techniques for join operations. The present invention satisfies this need.

SUMMARY OF THE INVENTION

A method, apparatus, and computer program product for executing an RDBMS in a computer system, wherein the RDBMS manages a relational database storing data in a large table and a small table. The RDBMS stores column values in columns of the large table and the small table in one or more rows spread across one or more objects. The RBMS also stores metadata comprising summarized information about the column values in the rows and objects of the small table (and optionally the large table). The RDBMS processes a query that joins the column of the small table to the column of the large table through an equivalence predicate, and derives one or more literal filter conditions for the equivalence predicate from the metadata of the small table. The RDBMS binds the literal filter conditions into the query, and performs a query execution plan for the query with the literal filter conditions, so that only the objects and/or rows in the large table that are qualified by the literal filter conditions are accessed, and the objects and/or rows in the large table that are not qualified by the literal filter conditions are avoided.

BRIEF DESCRIPTION OF DRAWINGS

Referring now to the drawings in which like reference numbers represent corresponding parts throughout.

DETAILED DESCRIPTION OF THE INVENTION

In the following description of the preferred embodiment, reference is made to the accompanying drawings, which form a part hereof, and in which is shown by way of illustration a specific embodiment in which the invention may be practiced. It is to be understood that other embodiments may be utilized, and structural changes may be made without departing from the scope of the present invention.

Overview

Modern data analysis relies heavily on object store databases for storing and querying vast amounts of data. Analyzing these vast object stores within the database presents a significant challenge especially when a fact table is joined by dimension tables and the fact table is larger than the dimension tables. Current methods often resort to scanning an entire table, leading to performance bottlenecks and inefficiencies.

This invention derives literal filter conditions from the dimension table's join (wherever it is feasible) and performs literal binding on the fact table's join columns in the query that helps in object and/or row filtering (without any cost considerations). Specifically, this invention introduces a method to enhance join operations by excluding objects and/or rows of the fact table outside a boundary range of join columns determined from the dimension table, aiming to bypass unnecessary objects and/or rows. In a best case scenario, this can significantly reduce the number of objects and/or rows qualified for the join. Also, binding of the boundary range on join columns of the query when performed early during parsing can provide opportunities for a subsequent optimization that analyzes an existing set of predicates to determine when either of the following conditions can be exploited to rewrite the query: a contradiction between the literal filter conditions with the existing predicate set or inferring new predicates from the literal filter conditions and the existing predicate set.

In one aspect, this invention provides an approach that leverages minimum and maximum (min/max) values from the smaller dimensional tables to achieve significant performance improvements when accessing the larger fact table. These min/max values from the smaller dimensional tables are used to qualify objects and/or rows in the larger fact table and filter out irrelevant objects and/or rows during query execution. This targeted filtering approach dramatically reduces the amount of data scanned, leading to faster query response times and improved scalability for large tables. Specifically, the present invention improves performance, in terms of CPU and I/O resources, when accessing the fact table.

Hardware and Software Environment

Figure 1:
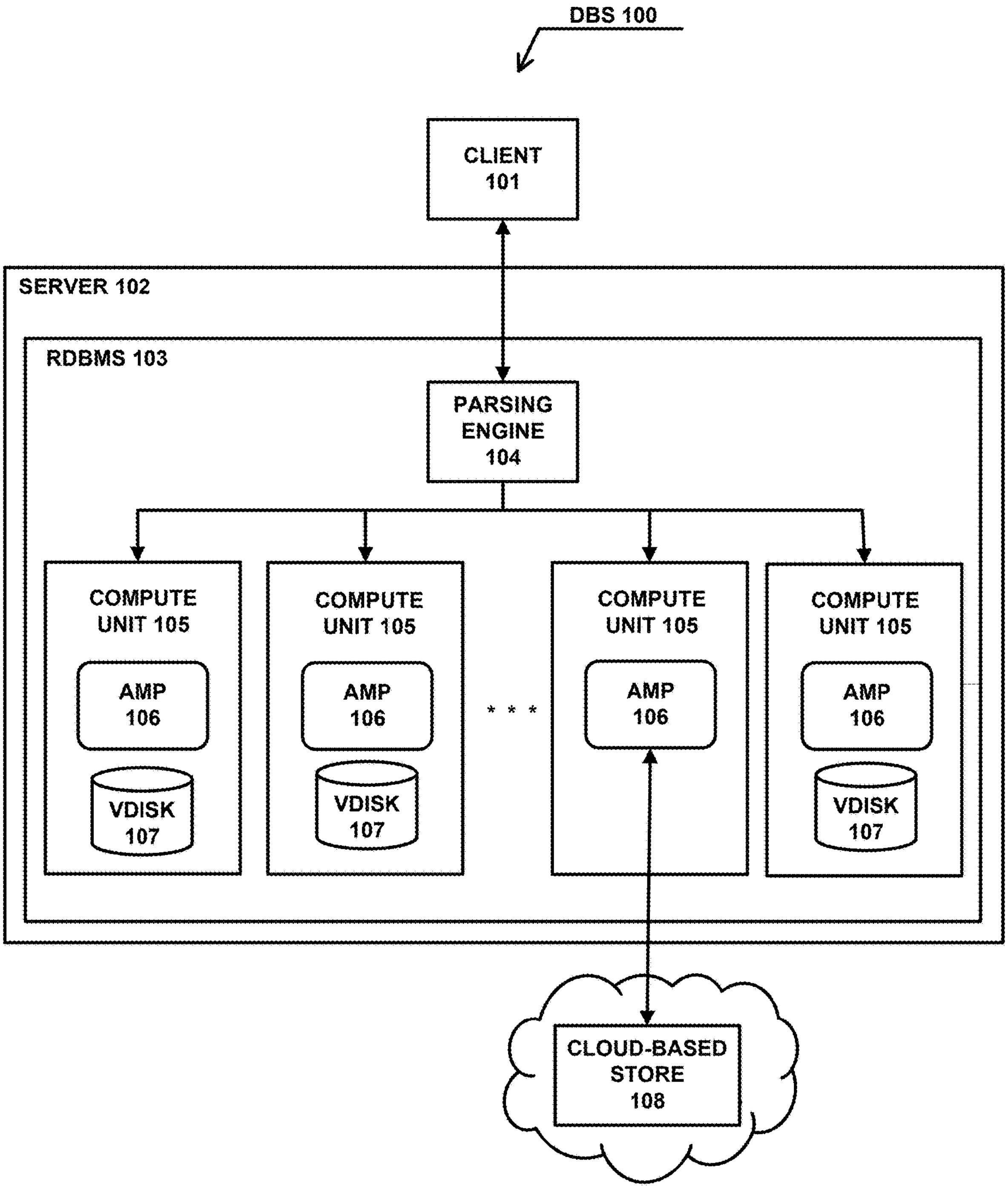
FIG. 1 illustrates an exemplary hardware and software environment according to one embodiment of the present invention.

FIG. 1 illustrates an exemplary hardware and software environment according to one embodiment of the present invention. In the exemplary environment, a database system (DBS) 100 is a computer system that implements a client-server architecture, wherein one or more client computers 101 may include, inter alia, a graphical user interface (GUI), which allows one or more users to interface with one or more server computers 102, which implement an RDBMS 103 that stores data and metadata in a relational database comprised of one or more tables. The DBS 100 may be implemented in separate machines, or may be implemented as separate or related processes in a single machine.

In one embodiment, the RDBMS 103 includes a parsing engine (PE) 104 that organizes storage of the data and coordinates retrieval of the data from the storage, one or more compute units 105 executing one or more access module processors (AMPs) 106 performing the functions of the RDBMS 103, and one or more virtual disks (VDISKs) 107 storing the relational database of the RDBMS 103. The compute units 105 comprise processors, and the AMPs 106 and VDISKs 107 comprise processes that may be implemented in one or more separate machines or in a single machine.

In one or more embodiments, the DBS 100 may connect to one or more cloud-based stores 108 via the AMP 106 or other component, wherein the cloud-based stores 108 store one or more objects (not shown), such as one or more datasets storing data. The cloud-based stores 108 may be a distributed native object store (NOS), such as AWS™ or other S3™ compatible systems, Microsoft™ Azure™, Google™ Cloud™, etc., or a distributed file system, such as a Hadoop Distributed File System (HDFS). The RDBMS 103 may retrieve the data from the objects in the cloud-based stores 108, wherein the data is then stored in the relational database for use by the RDBMS 103.

The RDBMS 103 used in one embodiment comprises the Teradata® Vantage® RDBMS sold by Teradata US, Inc., the assignee of the present invention, although other DBMS's could be used. In this regard, the Teradata® Vantage® RDBMS is a hardware and software based data warehousing and decision support system.

Generally, users of the DBS 100 interact with the client computers 101 to formulate requests for the RDBMS 103 executed by the server computers 102, wherein the requests access data stored in the RDBMS 103, and responses are received therefrom. In response to the requests, the RDBMS 103 performs the functions described below, including processing data retrieved from the RDBMS 103. Moreover, the results from these functions may be provided directly to the client computers 101, or may be provided to other computer systems (not shown), or may be stored by the RDBMS 103 in the relational database.

Note that, in one or more embodiments, the DBS 100 may use any number of different parallelism mechanisms to take advantage of the parallelism offered by the multiple tier architecture, the client-server structure of the client computers 101, server computers 102, RDBMS 103, PE 104, and the multiple compute units 105, AMPs 106, VDISKs 107 and cloud-based stores 108 of the RDBMS 103. Further, data within the relational database may be partitioned across multiple VDISKS 107, cloud-based stores 108, and/or other data storage devices to provide additional parallelism.

Generally, the client computers 101, server computers 102, RDBMS 103, PE 104, compute units 105, AMPs 106, VDISKs 107 and cloud-based store 108 comprise hardware, such as computers, processors, data storage devices and networks, and software, such as instructions, logic and/or data tangibly embodied in and/or accessible from a device, media, or carrier, such as one or more memory devices, one or more of the data storage devices, and/or one or more remote systems or devices communicating with the DBS 100 via one or more of the networks, thereby making an article of manufacture or a computer program product according to the invention. As such, the terms "article of manufacture" and "computer program product" as used herein are intended to encompass program instructions tangibly embodied in any computer-readable storage medium. Accordingly, such articles of manufacture and computer program products are readable by a computer system and the computer program product's instructions are executable by the computer system to cause the computer system to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Parsing Engine

Figure 2:
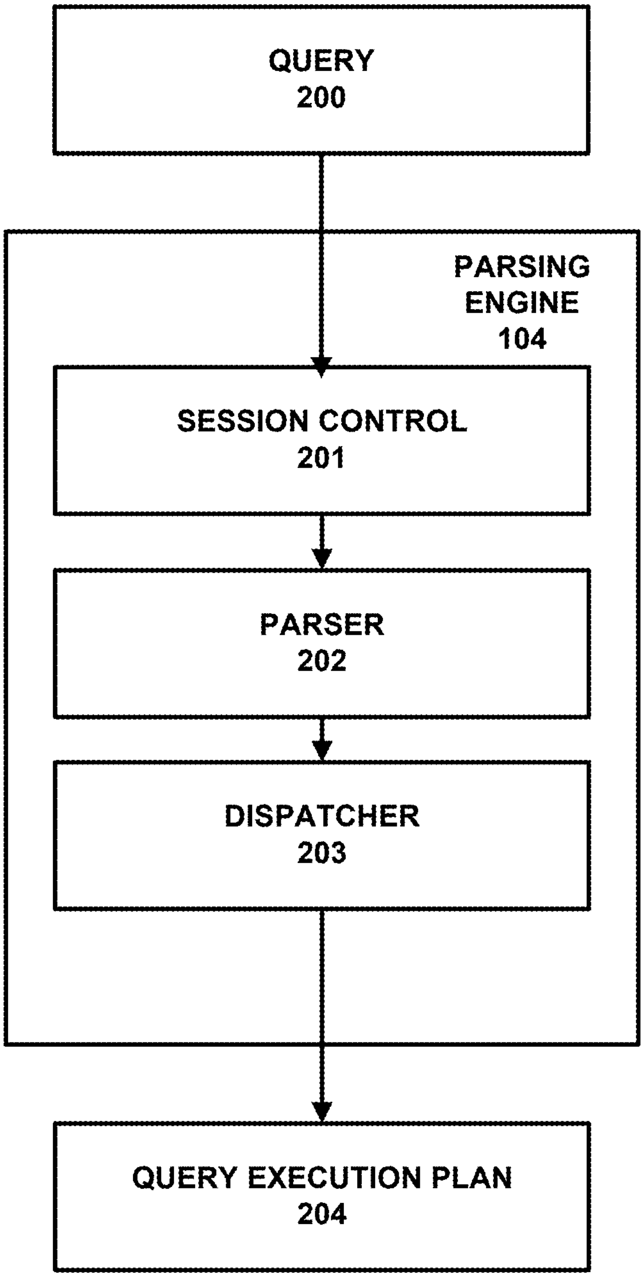
FIG. 2 illustrates an exemplary set of functions performed by a parsing engine when coordinating the retrieval of data in response to a query.

FIG. 2 further illustrates an exemplary set of functions performed by the PE 104 when coordinating the retrieval of data in response to a query 200. In one example, the PE 104 performs at least three functions: a session control 201, a parser 202, and a dispatcher 203. The session control 201 provides logon and logoff functions, and processes requests for access to the database. Once the session control 201 allows a request for access to the database to begin, the query 200 is routed to the parser 202, which interprets the query 200, and then to the dispatcher 203, which schedules and executes one or more resulting query execution plans 204 generated by the parser 202 using the AMPs 106 and VDISKs 107.

Figure 3:
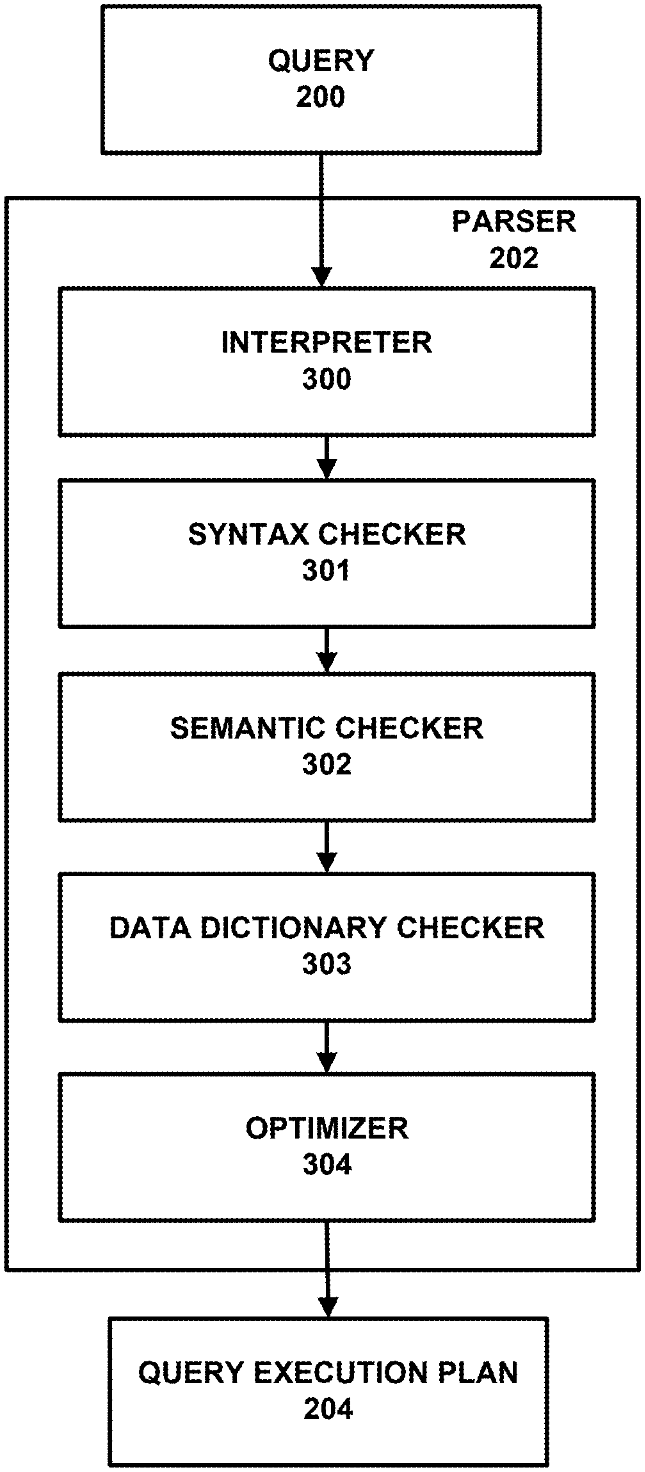
FIG. 3 illustrates an exemplary set of functions performed by a parser when interpreting a query.

FIG. 3 further illustrates an exemplary set of functions performed by the parser 202 when interpreting the query 200. An interpreter 300 interprets the query 200, a syntax checker 301 checks the query 200 for proper syntax, a semantic checker 302 evaluates the query 200 semantically, and a data dictionary checker 303 consults a data dictionary to ensure that all the data objects specified in the query 200 actually exist and that the user has the authority to access the data objects. Finally, an optimizer 304 generates one or more query execution plans 204 for the query 200 and selects an optimal query execution plan 204 (e.g., the least expensive plan) for the query 200, which is performed by the AMPs 106 and VDISKs 107.

In this invention, the PE 104 derives a literal filter condition based on a join predicate (for example, on numeric fields) in the query 200, which can reduce I/O and CPU when the literal filter condition can filter out a significant number of rows from a first table that is joined to a second table, wherein the first table is larger than the second table.

Figure 4:
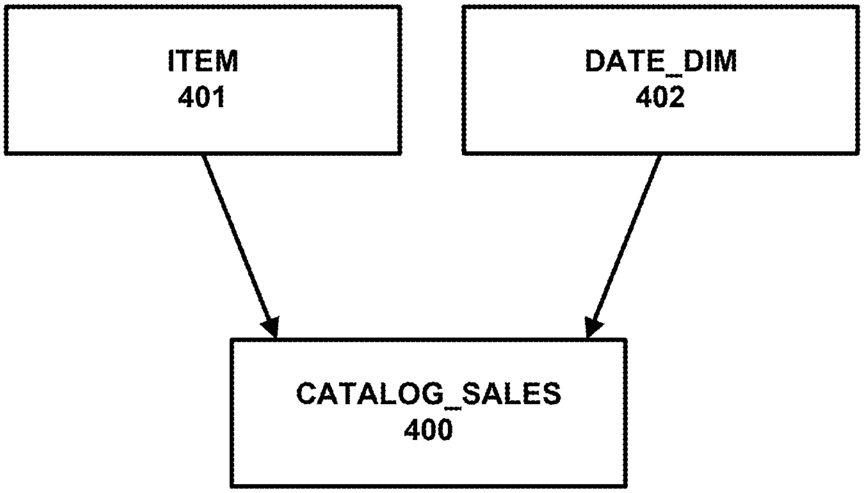
FIG. 4 illustrates a query graph of fact and dimension tables.

FIG. 4 is a query graph that illustrates a join operation, wherein the boxes 400, 401, 402 represent tables, and the connections between the boxes 400, 401, 402 represent the joins. In this example, a larger fact table 400, representing CATALOG_SALES, is joined by two or more smaller dimension tables 401, 402, representing ITEM and DATE_DIM, respectively, according to specified relational or conditional operations. Moreover, there are no join operations between the dimension tables 401, 402 themselves.

A typical query execution plan 204 for the query 200 would be to perform a sequence of binary joins between the tables 400, 401 and 402. It is the job of the optimizer 304 to select a least costly binary join order. Generally, the optimizer 304 would take into account that the fact table 400 has a relatively larger number of rows, while the dimension tables 401, 402 have relatively smaller number of rows. Nonetheless, there may be numerous unnecessary accesses to the fact table 400 and/or dimension tables 401, 402 when performing the join operations.

The optimization opportunity proposed by this invention can be better explained by looking at a query execution plan 204 generated for a TPC-DS benchmark query 200, which is a decision support (DS) benchmark query developed by Transaction Processing Performance Council (TPC) that models several generally applicable aspects of a decision support system (DSS), including queries and data maintenance. The TPC-DS benchmark query 200 provides a representative evaluation of performance as a general purpose DSS.

In this example, the TPC-DS benchmark query 200 includes the following query snippet:

```
Query 1:
SELECT    I_ITEM_ID
FROM      CATALOG_SALES, ITEM, DATE_DIM
WHERE     CS_ITEM_SK = I_ITEM_SK
          AND I_CATEGORY IN ('SPORTS', 'BOOKS', 'HOME')
          AND CS_SOLD_ DATE_SK = D_DATE_SK
          AND D_DATE BETWEEN CAST('1999-02-22' AS DATE)
          AND CAST('1999-02-22' AS DATE) + 30
GROUP BY  ...
```

The CATALOG_SALES fact table 400 includes columns for CS_ITEM_SK (item surrogate key), and CS_SOLD_DATE_SK (sold date surrogate key); the ITEM dimension table 401 includes columns for I_ITEM_ID (item identifier), I_ITEM_SK (item surrogate key), and I_CATEGORY (category); and the DATE_DIM dimension table 402 includes columns D_DATE_SK (date surrogate key) and D_DATE (date).

On a 1 terabyte (TB) scale, the CATALOG_SALES fact table 400 for TPC-DS would comprise around 1.4 billion rows, while the ITEM and DATE_DIM dimension tables 401, 402 are much smaller in comparison.

In this query, the CATALOG_SALES fact table 400 is joined with the ITEM and DATE_DIM dimension tables 401, 402 through the equality conditions of CS_ITEM_SK=I_ITEM_SK and CS_SOLD_DATE_SK=D_DATE_SK, in an order determined by the optimizer 304 using cost-based optimization. This implies that there would be at least one large join, and in the worst case, both joins can be large based on the number of rows produced by the first join.

Given that the joins are equality joins, and when predicate fields are of type numeric (including item and date surrogate keys), the join column of the fact table 400 (the larger table) is bound by a minimum and maximum (min/max) range of the join column from the dimension table 401, 402 (the smaller table) or vice-versa.

For example, in the join condition (CS_ITEM_SK=I_ITEM_SK), matching values for CS_ITEM_SK would strictly be in the range of (MIN (I_ITEM_SK) and MAX (I_ITEM_SK)). This means, using the min/max value domain from the join column of the dimension table 401, the PE 104 can derive literal filter conditions and thus literal value bindings for the fact table 400. This would result in "lean" joins for the fact table 400, which can vastly improve query 200 performance.

After derivation of the literal filter conditions, Query 1 set forth above could be rewritten by the PE 104 as follows:

```
Query 2:
SELECT    I_ITEM_ID
FROM      CATALOG_SALES, ITEM, DATE_DIM
WHERE     CS_ITEM_SK = I_ITEM_SK
          AND CS_ITEM_SK >= MIN(I_ITEM_SK)
          AND CS_ITEM_SK <= MAX(I_ITEM_SK)
          AND I_CATEGORY IN ('SPORTS', 'BOOKS', 'HOME')
          AND CS_SOLD_DATE_SK = D_DATE_SK
          AND CS_SOLD_DATE_SK >= MIN(D_DATE_SK)
          AND CS_SOLD_DATE_SK <= MAX(D_DATE_SK)
          AND D_DATE BETWEEN CAST('1999-02-22' AS DATE)
          AND CAST('1999-02-22' AS DATE) + 30
GROUP BY  ...
```

Application of the literal filter conditions on the fact table 400 based on the derivation of the min/max range of the join condition from the dimension table 401, 402 is relatively straightforward for Object File System (OFS) tables (where the min/max range can be retrieved from metadata) and relatively cheaper for Open Table Format (OTF) tables, Block File System (BFS) tables, or Native Object Storage (NOS) tables (where the min/max range can be computed from metadata). Otherwise, the min/max range can be computed from a scan of the dimension table 401, 402.

The following sections describe how a derived literal filter conditions can be generated to improve TPC-DS query performance:

Joins Involving Object File System (OFS) Tables

If the dimension table 401, 402 is an OFS table, then the derivation can be a rule-based rewrite by the PE 104 as finding the min/max range of a column is (relatively) free when column-level metadata is available.

In the following query, assume that both the CATALOG_SALES fact table 400 and the ITEM dimension table 401 are OFS tables with both ITEM.I_ITEM_SK and CATALOG_SALES.CS_ITEM_SK having column metadata:

```
Query 3:
SELECT      I_ITEM_ID
FROM        CATALOG_SALES, ITEM
WHERE       CS_ITEM_SK = I_ITEM_SK;
```

The min/max range for I_ITEM_SK can be obtained with a single I/O to read the metadata of the ITEM dimension table 401. Once the metadata is read, the min/max range for I_ITEM_SK can be extracted and passed back to the PE 104. The PE 104 can then apply this dynamic feedback to bind the literal filter conditions into the query 200 (e.g., by injecting the literal filter conditions into a condition tree for the query 200) before the optimizer 304 generates a query execution plan 204.

A rewritten Query 1 could look like the following:

```
Query 4:
SELECT      I_ITEM_ID
FROM        CATALOG_SALES, ITEM
WHERE       CS_ITEM_SK = I_ITEM_SK
            AND CS_ITEM_SK >= I_ITEM_SK_MINVALUE
            AND CS_ITEM_SK <= I_ITEM_SK_MAXVALUE;
```

The derived literal filter conditions, CS_ITEM_SK>=I_ITEM_SK_MINVALUE and CS_ITEM_SK<=I_ITEM_SK_MAXVALUE, which are the min/max range, can be eligible for literal-based object pruning and can also filter rows within the object as well. These literal filter conditions can also be passed down to perform low-level filtering (for example, row group filtering in the case of Parquet™ data files).

When both dimension tables 400, 401 in the join condition are OFS tables, literal filter conditions can be derived for both join tables 401, 402 without any extra overhead, when column metadata is available for both join tables 401, 402.

Joins Involving Open Table Format (OTF) Tables

If the dimension table 401, 402 is an OTF table, then the min/max range can be calculated using an aggregate non-correlated subquery of the metadata. The PE 104 can then apply this dynamic feedback to bind the literal filter conditions into the query 200 before the optimizer 304 generates a query execution plan 204. Thereafter, cost-based optimization of the query 200 should be performed by the optimizer 304.

In Query 3, if the ITEM and/or DATE_DIM dimension tables 401, 402 are OTF tables, the literal filter conditions for CS_ITEM_SK can be derived from the metadata comprising column level metrics and statistics (for example, row count, number of nulls in a column, sum and/or average aggregations for a column, bloom filters for indicating whether a column value is present in a row, etc.). The min/max range can be obtained before access path planning to derive new min/max range conditions on CS_ITEM_SK. The overhead for the PE 104 to read the metadata should be minimal.

Joins Involving Block File System (BSF) or Native Object Storage (NOS) Tables

If the ITEM and/or DATE_DIM dimension tables 401, 402 in Query 3 are BFS or NOS tables, then the column-level metadata may not exist, so new conditions on CS_ITEM_SK need to be generated using separate aggregate subqueries. The new conditions may look like the following:

```
Query 5:
SELECT   I_ITEM_ID
FROM     CATALOG_SALES, ITEM
WHERE    CS_ITEM_SK = I_ITEM_SK
         AND CS_ITEM_SK >= (SELECT MIN(I_ITEM_SK) FROM ITEM)
         AND CS_ITEM_SK <= (SELECT MAX(I_ITEM_SK) FROM ITEM);
```

The separate aggregate subqueries, SELECT MIN (I_ITEM_SK) FROM ITEM and SELECT MAX (I_ITEM_SK) FROM ITEM, can be treated as scalar subqueries (SSQs). The PE 104 can then apply this dynamic feedback to bind the literal filter conditions into the query 200 before the optimizer 304 generates a query execution plan 204. Thereafter, cost-based optimization of the query 200 should be performed by the optimizer 304.

These aggregations do consume resources, so generation of new conditions can be performed using cost-based optimization. The overhead of extra aggregation would be justified if the derived literal filter conditions eliminate most of the rows from the fact table 400.

Alternatives and Modifications

There can be multiple approaches on how the derivation of a min/max range for a join condition on the dimension table can be implemented.

In the case of OFS or OTF tables, if there are no additional conditions on the dimension table, the dimension table's min/max range is accessed from the dimension table's metadata. If there are additional conditions on the dimension table, these additional conditions can be applied to a scan of the dimension table, so that the derived literal filter conditions are further optimized. These additional conditions can either be processed using aggregation for a more accurate narrower range or can be derived using metadata for a less accurate wider range.

In either of these approaches, there would be some extra cost that needs to be accounted for in the PE 104. With a new subquery added for min/max values on dimension tables, the PE 104 has three options:

1) Static planning for a rewritten query without considering the new subquery condition, which would generate a first cost value;
2) Dynamic planning for a rewritten query with the new subquery condition, which would generate a second cost value; and 3) Dynamic planning for a rewritten query when the second cost value is less than the first cost value. If the original query itself qualifies for dynamic planning even without the new subquery condition, then the second cost value needs to compete with that plan as well, and the cheaper plan can be executed. Based on a study performed on the TPC-DS queries, adding the new subquery condition on dimension tables (with any existing filtering pushed into the subquery), results in the majority of queries showing better performance. This suggests that deriving the literal filter conditions would still be significantly beneficial overall, even if the PE 104 spends some time in processing the dimension table to determine the min/max range.

Benefits and Advantages

The literal filter conditions help join queries in multiple ways:

1) The literal filter conditions can trigger filtering when accessing the metadata. This would reduce the I/O to the object store by discarding unwanted objects. The best case for this filtering would be non-overlapped ranges on the filtering column across objects. The filtering would be most effective in this case. When all the objects overlap, i.e., the overlap factor is near 100%, literal based object filtering may not be that effective. However, there can be middling cases (which would most likely be the majority) where overlap would be present, but not that much, and these cases also benefit from the literal filter.

2) The literal filter conditions would also help in filtering of rows within the objects. When the overlap factor is high, even though object filtering is not that effective, row filtering inside the objects would still reduce the number of large table rows participating in the join. These conditions would also enable the literal filter conditions to be pushed down in the query to reduce stack depth and hence CPU.

3) For some of the queries, these literal filter conditions can trigger additional optimization, such as satisfiability and transitive closure. Also, binding would help obtain better estimates for the large table, which would in turn improve join cardinalities. Better cardinalities for the joins can implicitly help the optimizer to make more informed decisions and increase the possibility of better query execution plans.

This invention complements Dynamic Object Elimination (DOE). For OFS tables, when there is metadata on the tables, and to avoid reading unwanted rows from the fact table during a join, DOE performs a 2-step join: (1) the smaller dimension table is first joined with the metadata of the larger fact table to identify qualified objects, and (2) the result is then joined to the objects of the larger fact table that were qualified in the previous join. This approach works well when value range overlapping in the objects for a larger fact table is minimal; when a significant number of objects overlap, DOE might not work efficiently and can end up as overhead. In this invention, the literal filter condition on a larger fact table in a first join reduces the size of the metadata and in a second join filters rows during a scan of the larger fact table.

This invention also complements Object Filtering Join (OFJ). OFJ is a 2-step join method involving OSF tables that avoids accessing objects, which do not have rows to be joined. The first step in the OFJ is a join between the metadata of the larger fact table and the rows of the smaller dimension table. The second step in the OFJ is a join between the rows of the larger fact table and the output of the first step's join. The OFJ is sensitive to a value range overlap of join columns, where the more there is an overlap, the less the effectiveness of the optimization.

This invention tries to avoid accessing non-qualifying rows from the larger fact table by deriving the literal filter conditions on the join column. Once the literal filter conditions are derived, unwanted objects can be avoided based on the literal filter conditions, and the literal filter conditions can be applied to rows within the object.

This invention has the following advantages when compared to OFJ:

In the case of OFJ, during a first join, metadata for the larger fact table is joined with the smaller dimension table. With this invention, there is a literal filter condition on the larger fact table, which can be applied to the metadata as well as the data, thereby reducing the cost of accessing the metadata. The savings in both I/O and/or CPU can be significant if the fact table is large, in which case the number of metadata objects and/or rows would be large as well.

In the case of a value range overlap across objects, even though the effectiveness of object filtering based on the literal filter condition is relatively less, the binding would still help in filtering the reading of rows. In the case of Parquets™ objects, this would create opportunities to use filtering, multi-filtering and row-group filtering to improve scan performance.

The literal filter condition of this invention provides opportunities to apply other rewrite optimizations, such as satisfiability and transitive closure.

The binding of the literal filter condition can help in generating better estimates for the larger fact table, which would in turn would improve join cardinalities. Better join cardinalities can implicitly help the optimization to make more informed decisions and increase the possibility of better query execution plans.

The dynamic large table filtering of this invention and OFJ are not mutually exclusive optimizations and can coexist to obtain a maximum benefit. In fact, using a literal filter condition on a larger fact table can reduce the size of the metadata and thus OFJ's first join can be leaner and performant. Similarly, in the second join, the larger fact table will have the luxury of using the literal filter condition during the scan.

This invention also complements dynamic Incremental Planning and Execution (IPE). IPE is a request processing method that breaks complex queries into smaller query execution plan fragments and optimizes the fragments one at a time. Specifically, a subquery is generated in this invention either as a subquery on metadata or a non-correlated aggregate subquery, which can be treated as a query execution plan fragment, the results of which extract values from the dimension table that serve as the min/max range for a scan of the fact table.

This invention also complements a bloom filter on dimension table values, which is metadata indicating whether a column value is present in the dimension table. The bloom filter is then used to scan of the fact table.

This invention is not limited to joins between fact and dimension tables. Any join between a relatively larger table and a relatively smaller table benefits when a literal filter condition is derived using the equality join column of the relatively smaller table.

Experimental Results

In an experiment, the TPCS-20 query set forth below was used:

```
SELECT      ...
FROM        CATALOG_SALES, ITEM, DATE_DIM
WHERE       CS_ITEM_SK = I_ITEM_SK
            AND I_CATEGORY IN ('SPORTS', 'BOOKS', 'HOME')
            AND CS_SOLD_DATE_SK = D_DATE_SK
            AND D_DATE BETWEEN CAST('1999-02-22' AS DATE)
            AND CAST('1999-02-22' AS DATE) + 30
            ...
SAMPLE 100;
```

In this experiment, the CATALOG_SALES fact table 400 is an OFS table with 664 data files (objects). Normally, when the CATALOG_SALES fact table 400 is joined with the DATE_DIM dimension table 402, the join step must read all 664 objects. However, using this invention, only 7 objects were read for the join. The key here is the derived literal filter conditions that allow the RDBMS 103 to discard the majority of the objects for the larger fact table 400.

Consider also the following snippet after query rewrite:

```
SELECT    ...
FROM      CATALOG_SALES, ITEM, DATE_DIM
WHERE     CS_ITEM_SK = I_ITEM_SK
          AND CS_ITEM_SK >= (SELECT MIN(I_ITEM_SK) FROM ITEM WHERE
        I_CATEGORY IN ('SPORTS', 'BOOKS', 'HOME'))
          AND CS_ITEM_SK <= (SELECT MAX(I_ITEM_SK) FROM ITEM WHERE
        I_CATEGORY IN ('SPORTS', 'BOOKS', 'HOME'))
          AND I_CATEGORY IN ('SPORTS', 'BOOKS', 'HOME')
          AND CS_SOLD_DATE_SK = D_DATE_SK
          AND CS_SOLD_DATE_SK >= (SELECT MIN(D_DATE_SK) FROM DATE_DIM
        WHERE D_DATE BETWEEN CAST('1999-02-22' AS DATE)
          AND CAST('1999-02-22' AS DATE) + 30)
          AND D CS_SOLD_DATE_SK <= (SELECT MAX(D_DATE_SK) FROM
        DATE_DIM WHERE D_DATE BETWEEN CAST('1999-02-22' AS DATE)
          AND CAST('1999-02-22' AS DATE) + 30)
          AND D_DATE BETWEEN CAST('1999-02-22' AS DATE)
          AND CAST('1999-02-22' AS DATE) + 30
...
SAMPLE    100;
```

The effectiveness of the filtering largely hinges on the degree of overlap in the min/max ranges of the objects. In this invention, it appears that the benefits are primarily restricted to scenarios where rows are organized according to a join column. Therefore, in cases involving multiple joins on a fact table, it is likely that only the join responsible for row ordering will exhibit noticeable benefits.

Lastly, the performance improvements observed in the experimental results are mostly due to a reduction in the number of accessed objects; there was not much observed change in join orders. Effective object filtering which resulted in lean joins improved the performance.

Flowchart

Figure 5:
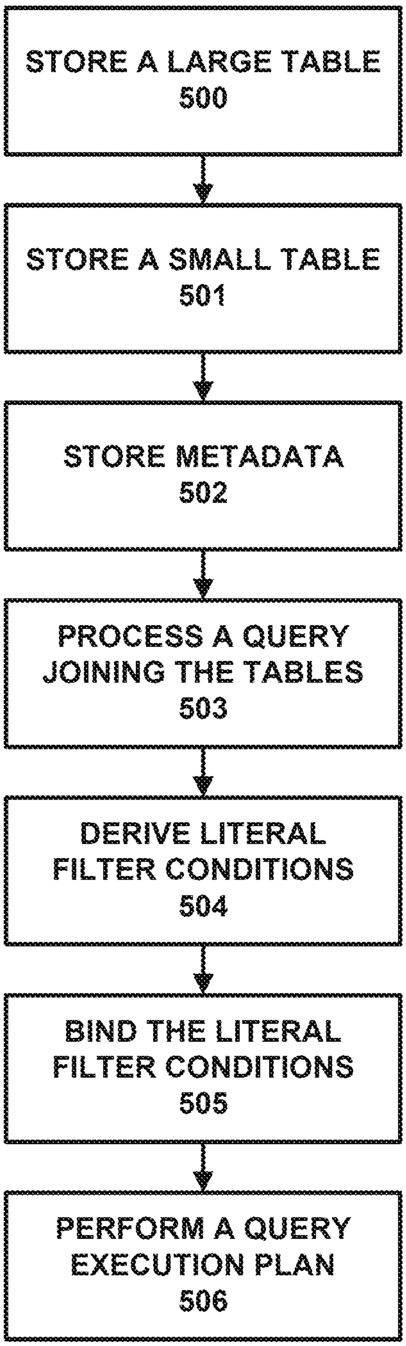
FIG. 5 is a flowchart that illustrates the steps or functions performed in the present invention, when joining a small table with a large table.

FIG. 5 is a flowchart that illustrates the steps or functions performed in the present invention, when executing an RDBMS in a computer system, wherein the RDBMS manages a relational database storing data in a large table and a small table, for example, the large table is a fact table and the small table is a dimension table, and the fact table is larger than the dimension table.

Block 500 represents a step or function where the RDBMS stores column values in a column of the large table in one or more rows spread across one or more objects.

Block 501 represents a step or function where the RDBMS stores column values in a column of the small table in one or more rows spread across one or more objects.

Block 502 represents a step or function where the RBMS stores metadata comprising summarized information about the column values in the rows and objects of the small table.

Optionally, the RBMS also stores metadata comprising summarized information about the column values in the rows and objects of the large table.

Block 503 represents a step or function where the RDBMS processes a query that joins the column of the small table to the column of the large table through an equivalence predicate.

Block 504 represents a step or function where the RDBMS derives one or more literal filter conditions for the equivalence predicate from the metadata of the small table. In one example, the literal filter conditions comprise a minimum and maximum (min/max) range for the column values in the column of the small table.

The literal filter conditions may be derived by: retrieving the min/max range from the metadata for the small table; or computing the min/max range from the metadata for the small table, wherein the min/max range is computed using an aggregate non-correlated subquery of the metadata, which may comprise a scalar subquery.

The literal filter conditions also may be derived by scanning the columns of the small table to determine the min/max range.

Optionally, this block represents a step or function where the RDBMS derives literal filter conditions for the equivalence predicate from the metadata of the large table. The literal filter conditions of the large table may help refine the literal filter conditions of the small table, before or after the RDBMS derives the literal filter conditions from the metadata of the small table.

Block 505 represents a step or function where the RDBMS binds the literal filter conditions into the query. Dynamic feedback is used by the RDBMS to bind the literal filter conditions into the query before subsequent optimization generates a query execution plan for the query.

The subsequent optimization may analyze the literal filter conditions to determine whether the literal filter conditions can be exploited to rewrite the query based on a contradiction between the literal filter conditions with the existing predicate set or inferring new predicates from the literal filter conditions and the existing predicate set.

In addition, the literal filter conditions may provide improved join cardinalities for the subsequent optimization.

Additional conditions may be applied to the small table, to further optimize the query. Moreover, the literal filter conditions may trigger additional optimizations.

In addition, the literal filter conditions may be treated as a query or query execution plan fragment for incremental planning and execution.

Block 506 represents a step or function where the RDBMS performs a query execution plan for the query with the literal filter conditions, so that only the objects and/or rows in the large table that are qualified by the literal filter conditions are accessed, and the objects and/or rows in the large table that are not qualified by the literal filter conditions are avoided.

In this regard, only the metadata for the small table may be accessed when the query is performed, and not the objects or rows of the small table. Similarly, only the metadata for the large table may be accessed when the query is performed, and not the objects or rows of the large table.

In addition, the literal filter conditions may be applied to metadata for the large table, for example, the literal filter conditions may be joined with the metadata of the large fact table to identify the qualified objects, and the literal filter conditions may be joined with the qualified objects to identify the qualified rows within the objects.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A computer-implemented method, comprising:

executing a relational database management system (RDBMS) in a computer system, wherein:

the RDBMS manages a relational database storing data in a large table and a small table;

the RDBMS stores column values in a column of the large table in one or more rows spread across one or more objects;

the RDBMS stores column values in a column of the small table in one or more rows spread across one or more objects;

the RDBMS stores metadata comprising summarized information about the column values in the rows and objects of the small table;

the RDBMS processes a query that joins the column of the small table to the column of the large table through an equivalence predicate;

the RDBMS derives one or more literal filter conditions for the equivalence predicate from the metadata of the small table;

the RDBMS binds the literal filter conditions to the query using dynamic feedback before subsequent optimization generates a query execution plan for the query; and the RDBMS performs a query execution plan for the query with the literal filter conditions, so that only the objects and/or rows in the large table that are qualified by the literal filter conditions are accessed, and the objects and/or rows in the large table that are not qualified by the literal filter conditions are avoided, wherein only the metadata is accessed when the query is performed, and not the objects or rows of the small table.

2. The method of claim 1, wherein the large table is a fact table and the small table is a dimension table.

3. The method of claim 1, wherein the large table is larger than the small table.

4. The method of claim 1, wherein the literal filter conditions comprise a minimum and maximum (min/max) range for the column values in the column of the small table.

5. The method of claim 4, wherein the literal filter conditions are derived by: retrieving the min/max range from the metadata for the small table; or computing the min/max range from the metadata for the small table.

6. The method of claim 5, wherein the min/max range is computed using an aggregate non-correlated subquery of the metadata.

7. The method of claim 6, wherein the aggregate non-correlated subquery is a scalar subquery.

8. The method of claim 4, wherein the literal filter conditions are derived by scanning the columns of the small table to determine the min/max range.

9. The method of claim 1, wherein dynamic feedback is used by the RDBMS to bind the literal filter conditions into the query before subsequent optimization generates the query execution plan for the query.

10. The method of claim 9, wherein the subsequent optimization analyzes the literal filter conditions to determine whether the literal filter conditions can be exploited to rewrite the query based on a contradiction between the literal filter conditions with an existing predicate set or inferring new predicates from the literal filter conditions and the existing predicate set.

11. The method of claim 9, wherein the literal filter conditions provide improved join cardinalities for the subsequent optimization.

12. The method of claim 9, wherein additional conditions are applied to the small table, to further optimize the query.

13. The method of claim 9, wherein the literal filter conditions trigger additional optimizations.

14. The method of claim 9, wherein the literal filter conditions are treated as a query or query execution plan fragment for incremental planning and execution.

15. The method of claim 1, wherein only the metadata is accessed when the query is performed, and not the objects or rows of the small table.

16. The method of claim 1, wherein the literal filter conditions are applied to metadata for the large table.

17. The method of claim 16, wherein the literal filter conditions are joined with the metadata of the large table to identify the qualified objects, and the literal filter conditions are joined with the qualified objects to identify the qualified rows within the objects.

18. A computer-implemented apparatus, comprising:

one or more processors; and one or more memories storing instructions that, when executed by the one or more processors, cause the one or more processors to implement a relational database management system (RDBMS) executing in a computer system, wherein:

the RDBMS manages a relational database storing data in a large table and a small table;

the RDBMS stores column values in a column of the large table in one or more rows spread across one or more objects;

the RDBMS stores column values in a column of the small table in one or more rows spread across one or more objects;

the RDBMS stores metadata comprising summarized information about the column values in the rows and objects of the small table;

the RDBMS processes a query that joins the column of the small table to the column of the large table through an equivalence predicate;

the RDBMS derives one or more literal filter conditions for the equivalence predicate from the metadata of the small table;

the RDBMS binds the literal filter conditions to the query using dynamic feedback before subsequent optimization generates a query execution plan for the query; and the RDBMS performs a query execution plan for the query with the literal filter conditions, so that only the objects and/or rows in the large table that are qualified by the literal filter conditions are accessed, and the objects and/or rows in the large table that are not qualified by the literal filter conditions are avoided, wherein only the metadata is accessed when the query is performed, and not the objects or rows of the small table.

19. A non-transitory computer program product comprising a computer readable storage medium tangibly embodying instructions accessible therefrom, the instructions executable by a computer system to cause the computer system to perform a method, comprising:

executing a relational database management system (RDBMS) in a computer system, wherein:

the RDBMS manages a relational database storing data in a large table and a small table;

the RDBMS stores column values in a column of the large table in one or more rows spread across one or more objects;

the RDBMS stores column values in a column of the small table in one or more rows spread across one or more objects;

the RDBMS stores metadata comprising summarized information about the column values in the rows and objects of the small table;

the RDBMS processes a query that joins the column of the small table to the column of the large table through an equivalence predicate;

the RDBMS derives one or more literal filter conditions for the equivalence predicate from the metadata of the small table;

the RDBMS binds the literal filter conditions to the query using dynamic feedback before subsequent optimization generates a query execution plan for the query; and the RDBMS performs a query execution plan for the query with the literal filter conditions, so that only the objects and/or rows in the large table that are qualified by the literal filter conditions are accessed, and the objects and/or rows in the large table that are not qualified by the literal filter conditions are avoided, wherein only the metadata is accessed when the query is performed, and not the objects or rows of the small table.

* * * * *